United States Patent [19]

Corley

[11] Patent Number: 5,449,726

[45] Date of Patent: Sep. 12, 1995

[54] MODIFIED BISIMIDE COMPOSITIONS

[75] Inventor: Larry S. Corley, Houston, Tex.

[73] Assignee: Shell Oil Company, Houston, Tex.

[21] Appl. No.: 355,449

[22] Filed: Dec. 13, 1994

Related U.S. Application Data

[63] Continuation of Ser. No. 65,310, May 21, 1993, abandoned.

[51] Int. Cl.[6] .................... C08F 222/40; C08F 236/22
[52] U.S. Cl. .................... 526/262; 526/335; 526/338; 524/548
[58] Field of Search ............... 526/262, 336, 338, 335

[56] References Cited

U.S. PATENT DOCUMENTS

| | | |
|---|---|---|
| 4,100,140 | 7/1978 | Zahir et al. . |
| 4,211,860 | 7/1980 | Stenzenberger . |
| 4,220,741 | 9/1980 | Renner et al. . |
| 4,288,583 | 9/1981 | Zahir et al. . |
| 4,518,754 | 5/1985 | Locatelli et al. . |
| 4,526,925 | 7/1985 | Parker et al. . |
| 4,730,030 | 3/1988 | Hahn et al. . |
| 4,927,907 | 5/1990 | Corley . |
| 5,086,139 | 2/1992 | Corley . |
| 5,233,002 | 8/1993 | Corley .................... 526/262 |

FOREIGN PATENT DOCUMENTS

| | | |
|---|---|---|
| 0464940A1 | 1/1992 | European Pat. Off. . |
| 63092624A | 10/1986 | Japan . |
| 63-092624 | 4/1988 | Japan . |

*Primary Examiner*—Joseph L. Schofer
*Assistant Examiner*—Wu C. Cheng

[57] ABSTRACT

A modified bisimide resin is prepared by copolymerizing a bisimide monomer and a cyclic triene. The copolymerization of a bisimide with a cyclic triene such as 1,2,4-trimethylenecyclohexane provides a modified bisimide having good fracture toughness.

16 Claims, No Drawings

MODIFIED BISIMIDE COMPOSITIONS

This is a continuation of application Ser. No. 08/065,310, filed May 21, 1993 now abandoned.

BACKGROUND OF THE INVENTION

This invention relates to thermosettable bisimide compositions. In one aspect, the invention relates to the preparation of cured bismaleimide resins having enhanced fracture toughness and processability.

Advanced composites are high-performance materials made up of a fiber-reinforced thermoplastic or thermosettable material. The thermosettable materials useful in advanced composites must meet a set of demanding property requirements. For example, such materials optimally have good high-temperature properties such as high (above 200° C.) cured glass transition temperature and relatively low (less than 4%) water absorbance at elevated temperature. Such materials must also exhibit high mechanical strength, as measured by fracture toughness and compression after impact. For ease of processing in preparing prepregs for composite parts, the uncured material will ideally have a low (below 120° C.) melting temperature and a wide temperature range of processable viscosity (a wide "processing window").

Bismaleimide resins are thermosettable materials with much promise for use in advanced composites. Disadvantages of bismaleimides, however, include brittleness and high melting points, the latter of which often requires bismaleimides to be used with solvents for acceptable processability.

Standard modifiers for bismaleimides have a number of disadvantages. Some, such as styrene, divinylbenzene, diisopropenylbenzene and certain derivatives thereof, are extremely reactive with maleimide groups by both Diels-Alder and radical mechanisms. This leads to a very short pot life for bismaleimide mixtures with these reactive diluents. These materials, while providing more easily processable bismaleimide resins, tend to be ineffective as tougheners for the resins. Diamines and dithiols generally share this disadvantage of high reactivity, and also the adducts of maleimide groups with amines or thiols are of somewhat low thermal stability. Other diluent modifiers, such as bisallyl, bis(allyloxy) or bispropenyl aromatic compounds, including diallyl bisphenol-A, adducts of allylphenols with epoxy resins, and noncyclic trienes such as myrcene, are somewhat less reactive than the vinyl aromatics but are deficient in elongation, strain capability and water resistance for some uses.

It is therefore an object of the invention to provide bisimide resin compositions having enhanced processability along with improved flexural strength, elongation and water resistance for composites applications.

BRIEF SUMMARY OF THE INVENTION

According to the invention, a curable composition is provided comprising a bisimide and a cyclic triene characterized by (a) a conjugated diene moiety having exocyclic double bonds attached to a single aliphatic ring and (b) an isolated double bond. The copolymerization of a bisimide with a cyclic triene such as 1,2,4-trimethylenecyclohexane provides a cured bisimide composition with good flexural strength and elongation and low water absorption.

DETAILED DESCRIPTION OF THE INVENTION

The invention composition includes a bisimide. Preferred bisimides include N,N'-bisimides of unsaturated dicarboxylic acids which can be represented by the formula

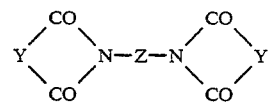

in which Y is a substituted or unsubstituted divalent group containing at least 2 carbon atoms, preferably 2 to 6 carbon atoms, and a carbon-carbon double bond, and Z is a divalent radical comprising at least 1, generally about 1 to 40 carbon atoms. Z can be aliphatic, cycloaliphatic, aromatic or heterocyclic. A preferred class of bisimides are difunctional bismaleimides derived from an aromatic diamine which can be represented by the formula

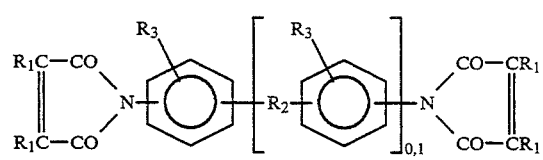

in which each $R_1$ is selected independently from H, $C_{1-2}$ alkyl or halide; $R_2$ is selected from divalent hydrocarbon radicals containing from about 1 to about 10 carbon atoms, —O—, —$SO_2$—, —COO—, —CONH—, —CO— and —S—; and each $R_3$ is selected independently from H, $C_{1-3}$ alkyl and halide.

Specific examples of bisimides include
1,2-bismaleimidoethane
1,6-bismaleimidohexane
1,3-bismaleimidobenzene
1,4-bismaleimidobenzene
2,4-bismaleimidotoluene
4,4'-bismaleimidodiphenylmethane
4,4'-bismaleimidodiphenylether
3,3'-bismaleimidodiphenylsulfone
4,4'-bismaleimidodiphenylsulfone
4,4'-bismaleimidodicyclohexylmethane
3,5-bis(4-maleimidophenyl)pyridine
2,6-bismaleimidopyridine
1,3-bis(maleimidomethyl)cyclohexane
1,3-bis(maleimidomethyl)benzene
1,1-bis(4-maleimidophenyl)cyclohexane
1,3-bis(dichloromaleimido)benzene
4,4'-biscitraconimidodiphenylmethane
2,2-bis(4-maleimidophenyl)propane
1-phenyl-1,1-bis(4-maleimidophenyl)ethane
α,α-bis(4-maleimidophenyl)toluene
3,5-bismaleimido-1,2,4-triazole
and various bismaleimides disclosed in U.S. Pat. Nos. 3,562,223, 4,211,860 and 4,211,861. Bismaleimides can be prepared by methods known in the art, as described in U.S. Pat. No. 3,018,290, for example.

The bisimide resin can contain imide oligomers according to the formula

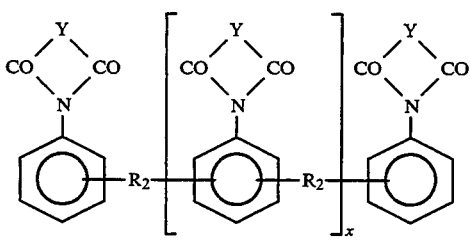

in which x is a number within the range of about 0 to about 0.5. Such oligomers may be present as an impurity in difunctional bisimides. The preferred bisimide resin is N,N'-4,4'-diphenylmethane bismaleimide.

The bisimide can contain various additives and modifiers as processing aids. The bisimide resin component can be a reaction product or prepolymer of a bisimide and an effective chain-extending agent such as an amine group-containing compound. Suitable amine group-containing compounds include diamines and polyamines represented by the general formula $(H_2N)_nQ$ or $(RNH)_nQ$ and aminophenols represented by the general formula $(NH_2)_nQ(OH)_m$ or $(RNH)_nQ(OH)_m$, in which Q is a divalent aromatic or alicyclic group and n is a number such that the average number of amine hydrogens per molecule in the amine mixture falls between about 1.95 and 2.5. Examples include bis(4-(N-methylamino)phenyl)methane, N,N'-dimethyl-1,3-diaminobenzene and the like. Such reaction products can be prepared by methods known in the art, such as contacting about 0.1 to about 0.8 mole of the chain-extending agent with each mole of the bisimide in an organic solvent at a temperature of about 40° to 200° for a time of about 5 minutes to 5 hours. The bisimide can be, for example, a hydrazide-modified bismaleimide as described in U.S. Pat. Nos. 4,211,860 and 4,211,861. Suitable N,N'-unsaturated bismaleimide resins are commercially available from Technochemie GmbH as Compimide ® resins, for example. The bisimide can be a mixture of bisimides described above tailored to meet specific processing requirements.

The invention composition includes a cyclic triene characterized by (a) a conjugated diene moiety in which exocyclic double bonds are attached to a single aliphatic ring and (b) an isolated double bond separated from the conjugated pair by a chemical linking group. Such trienes can be represented by one of formulas I and II:

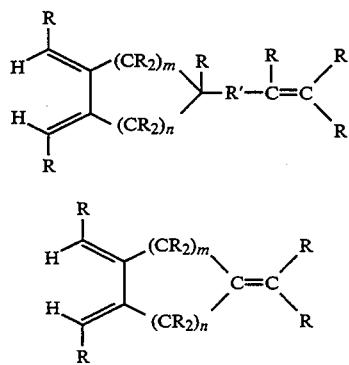

in which each R is selected independently from hydrogen and $C_{1-3}$ alkyl, and R' is a divalent linking group. R' can be, for example, a direct bond; alkylene, preferably $C_{2-12}$ alkylene; $—(CH_2)_pR''(CH_2)_q—$; and $—O—R'—O—$, in which p and q are integers from 0 to about 6 (p+q must equal at least 1) and R'' is $C_{1-12}$ alkylene, carbonyl, phenylene, an ester linkage, and the like. Trienes in which all R groups are hydrogen atoms are preferred. Trienes of structure II, particularly where n is 3 or less, are preferred over those of structure I. 1,2,4-trimethylene-cyclohexane (TMCH) is the preferred triene comonomer. The cyclic trienes can be prepared, for example, by gas-phase or liquid-phase cyclotrimerization of allene or substituted allenes, by Diels-Alder cycloaddition of 1,2-dimethylenecyclobutane (or a substituted 1,2-dimethylenecyclobutane) to a dienophile containing an isolated double bond (such as allyl acrylate) followed by thermal ring opening of the resultant cyclobutene ring, or by dehydrohalogenation of tris(haloalkyl)cycloalkanes such as 1,2,4-tris(chloromethyl)-cyclohexane.

The bismaleimide and the triene are combined in a molar ratio of triene:bisimide within the range of about 0.2 to 1.0, preferably about 0.3 to about 0.9, most preferably about 0.4 to about 0.9, in order to achieve the physical properties in the cured composition.

The bisimide and triene may be combined in any manner desired, such as melt, solution or powder blending. The preferred technique involves melting a mixture of the solid reactants at a temperature above the respective melting points but below the polymerization temperature of either monomer, and stirring the melt until a homogeneous mixture is achieved. The melt may also be held at temperatures above about 150° C. for desired periods of time in a process of prepolymerization to increase the crystallization resistance of the melt and/or to increase its viscosity to desired levels. The mixture can then be poured directly into a mold for polymerization, or it can be directly cooled for later polymerization.

The composition may contain an optional free radical inhibitor to inhibit free radical polymerization of the bisimide monomer. Generally, the free radical inhibitor will be present in the composition in an amount within the range of about 0.0002 to about 0.02 moles per mole of the bisimide, preferably from about 0.001 to about 0.01 moles. The free radical inhibitor can be added to the monomers in any manner effective for intimate blending of the monomers and free radical inhibitor. Free radical inhibitors include phenols such as t-butylcatechol, hydroquinone and p-methoxyphenol; quinones such as 1,4-benzoquinone and 1,4-naphthoquinone; polynitro aromatics such as picric acid and 2,4,6-trinitrotoluene; hydroxylamines such as diethylhydroxylamine; stable radicals such as di-t-butylnitroxide or diphenylpicrylhydrazyl; and certain polycyclic heterocycles such as phenothiazine. The preferred free radical inhibitor is phenothiazine.

Polymerization is effected by heating the mixture to a temperature effective to initiate reaction between the functional groups of the bisimide and the double bonds of the triene. The temperature is generally at least about 150° C., preferably within the range of about 170° to about 350° C., held for a time of about 2 hours or more, with the required reaction time dependent on the temperature-staging program used.

In order to achieve optimum properties in the copolymers, a mixture of the monomers and free radical inhibitor is heated at a temperature near or above the ultimate (fully cured) glass transition temperature of the copolymer composition for a time sufficient to produce essentially complete reaction of the monomers. "Essentially complete" reaction of the monomers has been reached when no further reaction exotherm is observed by differential scanning calorimetry (DSC) upon heating the copolymer. The time of the heat treatment, or "post-cure," will vary depending upon the monomers, the degree of pressure applied and any precuring of the monomer mixture.

The copolymers are useful as resin matrices for composites in aerospace and electronics applications, including large structural parts and circuit boards. Based on their long shelf life and relatively low melting point, some of the uncured mixtures are useful for making tacky prepregs which can then be molded into composites. They are also suitable for liquid resin processing methods such as filament winding, resin transfer molding, resin infusion molding, and pultrusion if the mixtures are heated to provide sufficiently low viscosity for fiber impregnation. The low dielectric constants of the cured copolymers make them suitable for electrical applications such as the manufacture of circuit boards.

For preparation of reinforced laminate materials, a fibrous substrate of glass, carbon, quartz, poly(p-phenyleneterephthalamide), polyester, polytetrafluoroethylene, poly(p-phenylenebenzobisthiazole), boron, paper or like material, in chopped, mat or woven form, is impregnated with a bisimide/triene composition in molten or solution form. A prepreg is formed by heating the impregnated substrate in an oven at a temperature sufficient to remove the solvent and optionally to partially cure without gelation, or "B-stage," the resin system, generally about 180° C. to about 230° C., preferably about 200° to about 220° C., for a time of up to about 2 hours, preferably about 10 to about 40 minutes. A laminate is fabricated by subjecting a set of layered prepregs to conditions effective to cure the resins and to integrate the prepregs into a laminated structure. The laminate can optionally include one or more layers of a conductive material such as copper.

Laminating generally involves subjecting the prepregs to a temperature above about 200° C., preferably from about 210° to about 350° C., for a time of at least about 1 hour, at a pressure within the range of about 50 to about 500 psi.

For some laminating applications, especially if the bisimide/triene mixture will be dissolved in a solvent before impregnation of the substrate, it may be advantageous to heat treat, or upstage, the bisimide/triene mixture prior to application to a laminating substrate, particularly if the mixture will be stored prior to use. Suitable heat treatment involves subjecting the bisimide/triene to an elevated temperature for a time sufficient to cause sufficient reaction and viscosity increase to inhibit crystallization of either or both monomers from the mixture upon storage, but not sufficient to gel the composition.

EXAMPLE 1

Preparation of 1,2,4-Trimethylenecyclohexane

A recirculating apparatus for the thermal dimerization and trimerization of allene was designed as follows. The heated reactor was a bank of approximately 110 segments each about 30 cm long of stainless steel tubing ½" (1.27 cm) in outside diameter. The segments were arranged vertically in series and connected to one another by U-shaped stainless steel connectors to which they were welded. The volume of the heated portion of the reactor (determined by filling it with water and weighing) was approximately 3.4 liters. The bank of tubes was immersed in a fluidized bed of aluminum oxide particles. Thermocouples wedged between the connectors of the reactor at various points allowed one to monitor wall temperature of different segments of the reactor.

Downstream from the reactor was a cold trap containing a cooling fluid at approximately −65° C. (for condensing allene dimers and trimers and some of the allene) above a flask which functioned as a gas-liquid separator. Downstream from the first trap was a second trap filled with dry ice in dichloromethane, guarding the outlet to the system (through an oil bubbler) to condense any allene which attempted to escape to the atmosphere. Condensed allene from this second trap also fell into the gas-liquid separator. The condensed material (allene dimers and trimers and some of the allene) from the traps fell to the bottom of the separator and then flowed through a fluoropolymer tube into a reservoir for liquid allene and allene dimers. Sufficient heat (from a warm water bath) was applied to this reservoir to keep the allene boiling gently (the reservoir temperature increased from about −20° C. to 30° C. during the course of a reaction run). The allene not condensed by the cold traps was combined with that evaporating from the reservoir. This stream of recovered allene was passed through a filter into a diaphragm pump which recirculated the allene back into the hot tube. A makeup stream of fresh allene from a cylinder was also introduced into the loop just upstream from the recirculation pump.

The system was first purged with nitrogen. The power to the fluidized bed was turned on and its temperature was brought to 450°–470° C. Allene was introduced into the system from the allene cylinder at a rate of 80–100 grams/hour. The allene supply from the cylinder was shut off two to three hours before the end of a dimerization run in order that the allene present in the system could be used up, with little allene remaining in the reservoir a the end. At the end of the day, the power to the fluidized bed was turned off, the system was allowed to cool, and the accumulated crude liquid product was poured into a bottle and weighed. Approximately 3 grams of phenothiazine was added per kilogram of crude liquid product to inhibit polymerization and oxidation of the dimers and trimers. The crude product was then analyzed by gas chromatography for peaks corresponding to two allene dimers, 1,2-dimethylenecyclobutane (1,2-DMCB) and 1,3-dimethylenecyclobutane (1,3-DMCB), and the allene trimer 1,2,4-trimethylenecyclohexane (TMCH). Data from seven hot tube reaction runs are shown in Table 1.

TABLE 1

| Run # | Reaction time, hr. | Allene used, grams | Crude liquid product, grams | Crude yield, % | GC peak area, % 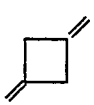 | 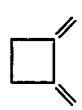 | 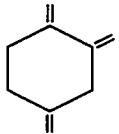 |
| --- | --- | --- | --- | --- | --- | --- | --- |
| 1 | 8.0  | 558  | 443 | 79.4 | 8.4 | 67.0 | 15.0 |
| 2 | 15.8 | 1197 | 881 | 73.6 | 8.1 | 75.0 | 11.0 |
| 3 | 11.3 | 862  | 753 | 87.3 | 8.3 | 73.4 | 11.4 |
| 4 | 11.2 | 824  | 647 | 78.5 | 8.3 | 71.6 | 14.0 |
| 5 | 11.8 | 932  | 806 | 86.5 | 8.5 | 68.7 | 15.4 |
| 6 | 11.4 | 909  | 746 | 82.1 | 8.4 | 68.0 | 16.2 |
| 7 | 11.0 | 872  | 724 | 83.0 | 8.5 | 69.0 | 15.7 |

The above materials were flash-distilled under vacuum to remove tars and were subsequently distilled under reduced pressure in 2.54 cm Oldershaw columns with 30 plates to yield purified fractions of allene dimers. Pot residues from distillations, containing the TMCH, were subsequently combined and fractionated to yield purified cuts of TMCH. The distilled TMCH fractions used in the following example contained 98–99% 1,2,4-trimethylenecyclohexane (by gas chromatographic peak area). The $^1$H and $^{13}$CNMR spectra supported the 1,2,4-trimethylenecyclohexane structure.

EXAMPLE 2

Cure of Mixtures of Bismaleimide with 1,2,4-Trimethylenecyclohexane (TMCH) in Comparison with Control Mixtures of Bismaleimide with Myrcene In the preparation of the TMCH-modified bismaleimide castings, 71.67 grams (0.20 moles) of bis(4-maleimidophenyl)methane (COMPIMIDE® MDAB bismaleimide) was weighed into 250- or 500-mL bottles and slurried in 180 grams of dichloromethane. Approximately 0.2 grams each of phenothiazine (radical polymerization inhibitor and antioxidant) and Monsanto PC-1344 (an acrylate oligomer antifoam, used to facilitate the preparation of void-free castings) were then added to each mixture. 1,2,4-Trimethylenecyclohexane (TMCH) was then added to each mixture in the quantities indicated in Table 2. The mixtures were shaken until the liquid phase was well mixed and then the cap was loosened to allow a small amount of dichloromethane to boil off to dissipate the exotherm from the Diels-Alder addition of the diene group of TMCH to the maleimide group of MDAB. When the boiling had stopped, the cap was tightened again and the bottles were placed on rollers and rolled overnight (or longer) to allow the completion of the Diels-Alder reaction. At this point, the mixtures were typically homogeneous solutions.

The solutions were then poured into 250-mL Erlenmeyer flasks with a vacuum connection. The flasks were then placed in a 135°–140° C. oil bath and the contents were swirled as dichloromethane and other volatile unreacted materials were removed, first at atmospheric pressure and then under mechanical pump vacuum for a few minutes until bubbling had essentially stopped. Degassed molten mixtures #1–#4 (Table 2) were then poured into a two-piece rectangular stainless steel mold, preheated to 150° C., with a 1/16" (1.59 mm) thick cavity, with the mold parts separated by a gastight silicone rubber gasket such that the mold could be pressurized during cure. These mixtures were cured by the cure schedule shown in Table 2. A few grams of each uncured sample were kept as a retain for characterization of uncured properties.

In the preparation of the myrcene-modified bismaleimide control castings, myrcene (SCM Glidco P&F grade) and bis(4-maleimidophenyl)methane were weighed into glass beakers in the proportions shown in Table 2 below (mixture sizes were from 50 to 80 grams). To all mixtures was added phenothiazine at a level of 0.53–0.54 mole % (based on bismaleimide) in order to inhibit radical polymerization. The beakers were then heated in an oil bath at approximately 150° C., with stirring, until the contents were homogeneous. The mixtures were then poured into the same molds used above and cured by the schedule shown in Table 2. A few grams of each uncured sample were kept as a retain for characterization of uncured properties.

The molds were then allowed to cool and the cured resin castings were removed from the molds. Physical properties of the castings were then determined as shown in Table 2. One can see that the TMCH/MDAB blends provide a number of advantages over the control castings of the myrcene/MDAB blends. First, at all but the lowest Tg level, the flexural elongation (both room temperature dry and 93° C. wet) of the TMCH/MDAB castings is well above that of the myrcene/MDAB castings at constant Tg. The same is true for room temperature dry flexural strength, while the 93° C. wet flexural strength for the TMCH/MDAB castings is uniformly well above that of myrcene/MDAB castings of similar Tg, even at the lowest Tg level. Water absorption of the TMCH/MDAB castings is also uniformly well below that of the myrcene/MDAB castings of similar Tg. Modulus retention under 93° C. wet conditions is higher for the TMCH/MDAB castings (even though room temperature dry flexural modulus is lower).

TABLE 2

Properties of castings from bismaleimides modified with 1,2,4-trimethylenecyclohexane (TMCH)

| Triene/BMI molar | Triene used | Dynamic mechanical | R.T. dry (93° C. wet)[b] flexural (ASTM D-790) | | | Compact tension fracture toughness, $K_q$, MPa-m$^{\frac{1}{2}}$ |
| --- | --- | --- | --- | --- | --- | --- |
| | | | Strength | Modulus | Elong. | |

TABLE 2-continued

| | | | | Properties of castings from bismaleimides modified with 1,2,4-trimethylenecyclohexane (TMCH) | | | |
|---|---|---|---|---|---|---|---|
| Casting | ratio | (cure cycle)[a] | Tg, °C. | MPa | GPa | % | (ASTM E 399-83) |
| 1 | 0.55 | TMCH (A) | 370 | 153 ± 1 (109 ± 7) | 3.19 ± 0.01 (2.72 ± 0.01) | >6.5 (5.4 ± 0.9) | 0.54 ± 0.03 |
| 2 | 0.70 | TMCH (A) | 350 | 135 ± 12 (100 ± 2) | 3.01 ± 0.02 (2.53 ± 0.01) | >6.0 (>6.5) | 0.72 ± 0.04 |
| 3 | 0.85 | TMCH (A) | 337 | 148 ± 2 (106 ± 7) | 2.98 ± 0.01 (2.61 ± 0.03) | >6.5 (5.8 ± 1.0) | 0.66 ± 0.03 |
| 4 | 1.00 | TMCH (A) | 285 | 116 ± 25 (105 ± 11) | 3.23 ± 0.02 (2.95 ± 0.04) | 3.8 ± 1.0 (4.0 ± 0.6) | 0.68 ± 0.04 |
| 5 | 0.45 | Myrcene (B) | 387 | 117 ± 5 (75 ± 5) | 3.33 ± 0.01 (2.71 ± 0.01) | 4.1 ± 0.2 (2.9 ± 0.2) | 0.66 ± 0.02 |
| 6 | 0.55 | Myrcene (B) | 365 | 117 ± 10 (82 ± 7) | 3.32 ± 0.04 (2.51 ± 0.02) | 4.3 ± 0.7 (3.8 ± 0.5) | 0.58 ± 0.02 |
| 7 | 0.65 | Myrcene (B) | 321 | 106 ± 15 (75 ± 6) | 3.14 ± 0.07 (2.51 ± 0.05) | 4.2 ± 0.9 (3.4 ± 0.3) | 0.69 ± 0.03 |
| 8 | 0.75 | Myrcene (B) | 276 | 135 ± 6 (92 ± 6) | 3.31 ± 0.06 (2.62 ± 0.04) | 6.3 ± 1.1 (4.6 ± 0.8) | 0.69 ± 0.01 |

| | Dielectric constant (dissipation factor), MHz (ASTM D 229/15) | | Solvent pickup, % | | |
|---|---|---|---|---|---|
| Casting | | Time | 93° C. $H_2O$ | R. T MEK[c] | R. T. $CH_2Cl_2$ |
| 1 | 3.63 (0.0150) | 1 day 2 weeks | 1.89 2.71 | −0.75 −1.75 | 7.79 67.9 |
| 2 | 3.63 (0.0154) | 1 day 2 weeks | 2.09 2.72 | −0.69 −0.33 | 16.8 71.4 |
| 3 | 3.45 (0.0148) | 1 day 2 weeks | 1.76 2.32 | −0.58 −1.19 | 24.4 85.4 |
| 4 | 3.04 (0.0119) | 1 day 2 weeks | 1.24 1.82 | −0.32 −0.90 | disint. |
| 5 | 3.07 (0.0113) | 1 day 2 weeks | 2.86 3.27 | −0.49 −1.00 | 0.33 4.61 |
| 6 | 3.22 (0.0120) | 1 day 2 weeks | 3.17 3.50 | −0.37 −0.93 | 1.88 16.6 |
| 7 | | 1 day 2 weeks | 2.98 3.28 | −0.38 −0.87 | 4.87 36.0 |
| 8 | 3.07 (0.0105) | 1 day 2 weeks | 2.86 2.84 | −0.25 −0.62 | 15.7 66.8 |

[a]Cure cycles:
A = (under 700 kPa (~85 psig) nitrogen pressure) 1 hr. at 150° C., followed by ramping linearly to 290° C. over a period of 3.5 hours and then holding 1 hr. at 290° C.
B = (under 700 kPa (~85 psig) nitrogen pressure) 1 hr. at 150° C., 1 hr. at 180° C., 1 hr. at 210° C., 30 min. at 230° C., 30 min. at 250° C., 30 min. at 270° C. and 1 hr. at 290° C.
[b]After 14-day immersion in 93° C. water.
[c]MEK = methyl ethyl ketone.

I claim:
1. A composition comprising
(a) a bisimide of an unsaturated dicarboxylic acid as represented by the formula

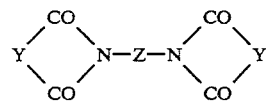

in which Y is a substituted or unsubstituted divalent moiety containing at least 2 carbon atoms and a carbon-carbon double bond, and Z is a divalent linking group;
(b) a cyclic triene according to one of formulas I and II:

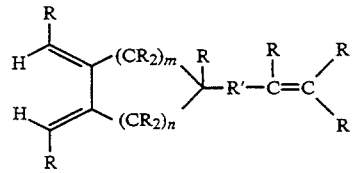

I

-continued

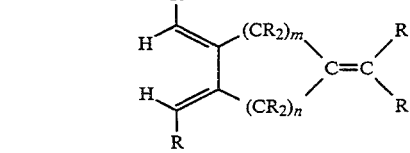

II in which each R is selected independently from hydrogen and $C_{1-3}$ alkyl, R' is a divalent linking group, each of m and n is an integer within the range of 0 and 6, and m+n is at least 2.
2. The composition of claim 1 in which R' is $C_{2-12}$ alkylene.
3. The composition of claim 2 in which each R is selected from hydrogen and methyl.
4. The composition of claim 1 in which R' is —O—R″—O—, in which R″ is selected from $C_{2-12}$ alkylene and phenylene.
5. The composition of claim 1 in which the cyclic triene is 1,2,4-trimethylenecyclohexane.
6. The composition of claim 1 in which the molar ratio of the cyclic triene to the bisimide is within the range of about 0.2–1.0:1.

7. The composition of claim 6 in which the cyclic triene is 1,2,4-trimethylenecyclohexane.

8. The composition of claim 7 in which the bisimide comprises N,N'-4,4'-diphenylmethane bismaleimide.

9. The composition of claim 1 which further comprises from about 0.0002 to about 0.2 moles, per mole of the bisimide, of a free radical polymerization inhibitor.

10. The composition of claim 8 which further comprises from about 0.0002 to about 0.2 moles, per mole of the bisimide, of phenothiazine.

11. The composition of claim 8 in which the molar ratio of the 1,2,4-trimethylenecyclohexane to the bisimide is within the range of about 0.4–0.9:1.

12. The composition of claim 1 which further comprises a fibrous reinforcing agent.

13. The composition of claim 12 in which the fibrous reinforcing agent comprises carbon fibers.

14. The composition of claim 12 in which the fibrous reinforcing agent comprises glass fibers.

15. An article of manufacture comprising a cured composition according to claim 1.

16. An article of manufacture comprising a cured composition according to claim 12.

* * * * *